United States Patent

Ishii et al.

[11] Patent Number: 5,603,874
[45] Date of Patent: Feb. 18, 1997

[54] METHOD FOR MOLDING POLYURETHANE SEAT PADS

[75] Inventors: Seiji Ishii, Yokohama; Toshio Iwasawa, Kanagawa-ken, both of Japan

[73] Assignee: Bridgestone Corporation, Tokyo, Japan

[21] Appl. No.: 517,662

[22] Filed: Aug. 22, 1995

Related U.S. Application Data

[63] Continuation of Ser. No. 134,615, Oct. 12, 1993, abandoned.

[30] Foreign Application Priority Data

Oct. 15, 1992 [JP] Japan .................... 4-303028

[51] Int. Cl.$^6$ .................... B29C 44/06; B29C 44/12
[52] U.S. Cl. .................... 264/46.5; 264/45.1; 264/46.4; 264/46.6; 264/271.1; 427/230
[58] Field of Search .................... 264/46.4, 46.5, 264/46.6, 271.1, 45.1; 427/230

[56] References Cited

U.S. PATENT DOCUMENTS

| | | | |
|---|---|---|---|
| 4,424,240 | 1/1984 | Kielbania, Jr. ...................... | 427/393.5 |
| 4,440,899 | 4/1984 | Peerlkamp ...................... | 524/528 |
| 4,457,729 | 7/1984 | Peerlkamp ...................... | 264/46.6 |
| 4,563,388 | 1/1986 | Bonk et al. ...................... | 427/208.4 |
| 4,612,249 | 9/1986 | Packer et al. ...................... | 428/424.8 |
| 4,613,653 | 9/1986 | Kitchens et al. ...................... | 525/352 |
| 4,923,746 | 5/1990 | Balmisse et al. ...................... | 428/309.9 |
| 5,244,612 | 9/1993 | Iwasawa et al. ...................... | 264/46.5 |

FOREIGN PATENT DOCUMENTS

| | | |
|---|---|---|
| 0251959A1 | 1/1988 | European Pat. Off. . |
| 0431981A3 | 6/1991 | European Pat. Off. . |
| 0454333A1 | 10/1991 | European Pat. Off. . |
| 2121191 | 6/1989 | United Kingdom . |
| 2221837 | 2/1990 | United Kingdom . |

OTHER PUBLICATIONS

Abstract of J59047277, World Patents Index, Derwent Publications Ltd., London, GB, 16 Mar. 1984.

*Primary Examiner*—Allan R. Kuhns
*Attorney, Agent, or Firm*—Birch, Stewart, Kolasch & Birch, LLP

[57] ABSTRACT

A polyurethane seat pad having a center seat portion and bank portions therearound is molded by using a mold defining a cavity having a center region corresponding to the center seat portion and side regions corresponding to the bank portions, placing collecting vessels of expanded polyolefin in the side regions of the mold cavity, pouring a foamable polyurethane liquid for low hardness foam into the cavity between said collecting vessels, pouring a foamable polyurethane liquid for high hardness foam into said collecting vessels, and causing the foamable liquids to expand, thereby producing a polyurethane seat pad having the collecting vessels embedded therein. The expanded polyolefin is a crosslinked polyolefin foam having an index of surface wetting of at least 36 dyne/cm. The seat pad in which the bank portions have higher hardness than the seating portion and which is fully durable against repetitive loading can be produced to the desired configuration in a stable manner.

12 Claims, 2 Drawing Sheets

METHOD FOR MOLDING POLYURETHANE SEAT PADS

This application is a continuation, of application Ser. No. 08/134,615 filed on Oct. 12, 1993, now abandoned.

BACKGROUND OF THE INVENTION

1. Field of the Invention

This invention relates to a method for molding polyurethane seat pads for use as automotive seats, and more particularly, to a method for molding polyurethane seat pads having a center seating portion and bank or raised portions on opposite sides thereof or along the periphery thereof having a higher hardness than the center seating portion.

2. Prior Art

In these days, seats for automobiles and other vehicles are often manufactured by furnishing polyurethane seat pads each having a center seating portion and a pair of bank or raised portions on opposite sides thereof and covering the pads with shells or covers. Some polyurethane seat pads have uniform hardness throughout, but polyurethane seat pads in which the bank portions are harder than the seating portion are more popular for their stable support to the human body and the improved aesthetic appearance of finished covers. Especially preferred is a seat pad in which only the outer peripheral zone of the bank portion is made of high rigidity material and the inner zone of the bank portion surrounded by the outer peripheral zone, that is, the inner zone of the bank portion surrounding and defining the seating portion is made of relatively soft material. Since the portion of the seat pad which comes in direct contact with the human body is soft enough, this seat pad gives no uncomfortable feel to the person to sit on and ensures improved supporting and holding ability and improved outer appearance.

Prior art methods for preparing such seat pads include an insert method involving the steps of burying in a foaming polyurethane liquid a separate insert in the form of a high rigidity polyurethane foam such as chip molded parts and semi-hard parts and causing the liquid to expand to form an integral foam having the insert buried therein; and another method involving the steps of preforming a collecting vessel from expanded polystyrene, placing the collecting vessel in a mold, and pouring in the collecting vessel a foaming polyurethane liquid capable of forming polyurethane having higher rigidity as disclosed in Japanese Patent Publication (JP-B) No. 811/1992 or U.S. Pat. No. 4,923,746.

These methods, however, have several drawbacks. The former method must separately mold a high rigidity insert and thus significantly adds to the cost. In the latter method, thermal contraction of expanded polystyrene is essential for the expanded polystyrene to bond with urethane foam. Since thermal contraction of expanded polystyrene abruptly takes place in a very narrow temperature range and excessive contraction can cause deformation of the collecting vessel itself, a careful temperature control is required, leaving a problem of production yield. In addition, since expanded polystyrene is susceptible to attack by organic solvents, a highly polar solvent such as methylene chloride contained in the foaming polyurethane liquid as a foaming agent can attack the collecting vessel of expanded polystyrene to form holes or cause substantial deformations, failing to obtain products with good outer appearance.

To overcome these problems, the inventors previously proposed in Japanese Patent Application Kokai (JP-A) No. 261410/1991, USSN 07/623,689, now U.S. Pat. No. 5,244,612 or EP 431981A2 a method for molding a polyurethane seat pad having a center seat portion and bank portions on opposite sides thereof or along the periphery thereof using a mold defining a cavity having a center region corresponding to the center seat portion and side regions corresponding to the bank portions, comprising the steps of: placing collecting vessels of expanded polyolefin in the side regions of the mold cavity, pouring a foaming polyurethane liquid for producing a low hardness foam into the cavity between said collecting vessels, pouring a foaming polyurethane liquid for producing a high hardness foam into said collecting vessels, and causing the foaming liquids to expand, thereby producing a polyurethane seat pad having the collecting vessels embedded therein.

This molding method overcame the above-mentioned problems since the expanded polyolefin is more resistant against heat and chemicals than expanded polystyrene. In addition, that side of the bank portion facing the seating portion is formed of urethane foam. There is thus obtained a seat pad which is comfortable to sit on.

Our previously proposed molding method using expanded polyolefin as collecting vessels involves placing the collecting vessels in the side regions of the mold cavity and pouring a foaming polyurethane liquid into the collecting vessels secured in the mold cavity still has the problem that if the collecting vessels themselves have less flexural strength, they cannot be fixedly secured within the mold at a desired position or they can be deformed, deflected or even drop down from the secured position by the weight of the foaming polyurethane liquid admitted therein, and they can be changed in shape by the pressure or heat exerted upon foaming of the foaming polyurethane liquid, failing to produce seat pads of desired configuration. That is, there are sometimes obtained seat pads which have varying hardness in the side or bank portions. This problem might be overcome by increasing the thickness of expanded polyolefin or by reducing the foaming rate, but the resulting side or bank portions providing an uncomfortable feel.

The expanded polyolefin left in the cured polyurethane foam, which is essentially poor in adhesion to the polyurethane, apparently shows an integral structure, but tends to delaminate through repetitive compression during long term use as the seat. Such delamination causes the seat pad to change rigidity in its side or band portions and gives a negative impact on the comfortable feel to sit on since the collecting vessels are felt as foreign matter.

SUMMARY OF THE INVENTION

Therefore, an object of the present invention is to provide a method for producing a polyurethane seat pad having a center seat portion and a bank portion on either side thereof or along the periphery thereof, the bank portion having higher hardness than the center portion, the method being capable of molding the seat pad of desired configuration in a stable and consistent manner such that the seat pad may be durable over a long term of use.

According to the present invention, there is provided a method for molding a polyurethane seat pad having a center seat portion and bank portions on opposite sides thereof or along the periphery thereof using a mold defining a cavity having a center region corresponding to the center seat portion and side regions corresponding to the bank portions, comprising the steps of: placing collecting vessels of expanded polyolefin in the side regions of the mold cavity, pouring a foamable polyurethane liquid for producing a low hardness foam into the cavity between the collecting vessels, pouring a foamable polyurethane liquid for producing a high hardness foam into the collecting vessels, and causing the foamable liquids to expand, thereby producing a polyurethane seat pad having the collecting vessel embedded therein, characterized in that the expanded polyolefin is a crosslinked expanded polyolefin having an index of surface wetting of at least 36 dyne/cm.

The present invention is an improvement over the method of JP-A 261410/1991 or EP 431981A2 referred to above. By using a crosslinked expanded polyolefin having an index of surface wetting of at least 36 dyne/cm as the material of which the collecting vessels are made, a seat pad can be molded to a desired configuration having a center seat portion and a higher hardness bank portion on either side thereof or along the periphery thereof in a stable and consistent manner, the seat pad being durable over a long term of use.

Conventional known foamable urethane liquids for forming seat pads include those of the cold cure type in which the maximum exothermic temperature (Tmax) upon foaming/curing reaction is relatively low and those of the hot cure type in which the Tmax is relatively high. Some conventional manufacturing lines are designed to concurrently pour plural types of foamable liquids in a single mold, one of the foamable liquids being a foamable liquid of the hot cure type with high Tmax. Also where it is desired to complete urethane foaming/curing reaction within a certain time for quick removal from the mold, external heating is provided for promoting the curing reaction. We found that in these cases, the foam interior can be relatively hot although foaming reaction itself is less exothermic as in the cold cure type. Under such high temperature conditions continuing until the completion of polyurethane foaming reaction, conventional expanded polyolefins can be readily deformed by the weight and foaming pressure of the foaming urethane liquid, making it difficult to mold to the desired configuration. In this regard, the crosslinked polyolefin foam is fully resistant against such high temperatures and does not thermally deform or melt so that the collecting vessels thereof may maintain their shape unchanged, ensuring consistent molding to a desired configuration. In addition, the crosslinked polyolefin foam has a flexural modulus high enough to allow the collecting vessels to be reduced in wall thickness and a density low enough to eliminate any adverse affect to the physical touch or feel of the resulting seat pad. Moreover, the crosslinked polyolefin foam must possess a surface having affinity to the foamable urethane liquid. In particular, crosslinked polyolefin foam having an index of surface wetting of at least 36 dyne/cm can firmly bond with the cured polyurethane foam without the need for an adhesive so that there occur no separation between the crosslinked polyolefin foam and the polyurethane foam even when compressive forces are repeatedly applied during long term use. The crosslinked polyolefin foam can be readily formed to the shape of a collecting vessel by conventional techniques such as vacuum forming. For these reasons, the crosslinked polyolefin foam lends itself to the application intended herein.

BRIEF DESCRIPTION OF THE DRAWINGS

The above and other objects, features, and advantages of the present invention will be better understood from the following description taken in conjunction with the accompanying drawings, in which.

Like parts are designated by the same reference numerals throughout the figures.

DETAILED DESCRIPTION OF THE INVENTION

Figure 1:
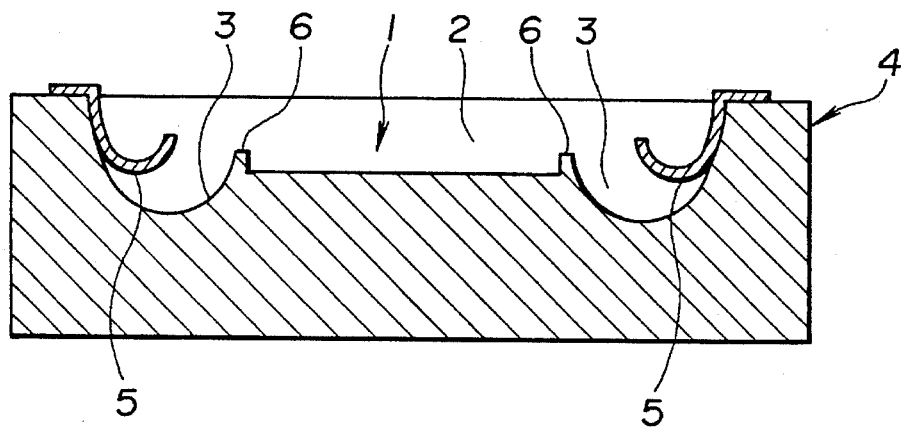
FIG. 1 is a schematic cross section of a mold used in the practice of the present invention.
Figure 2:
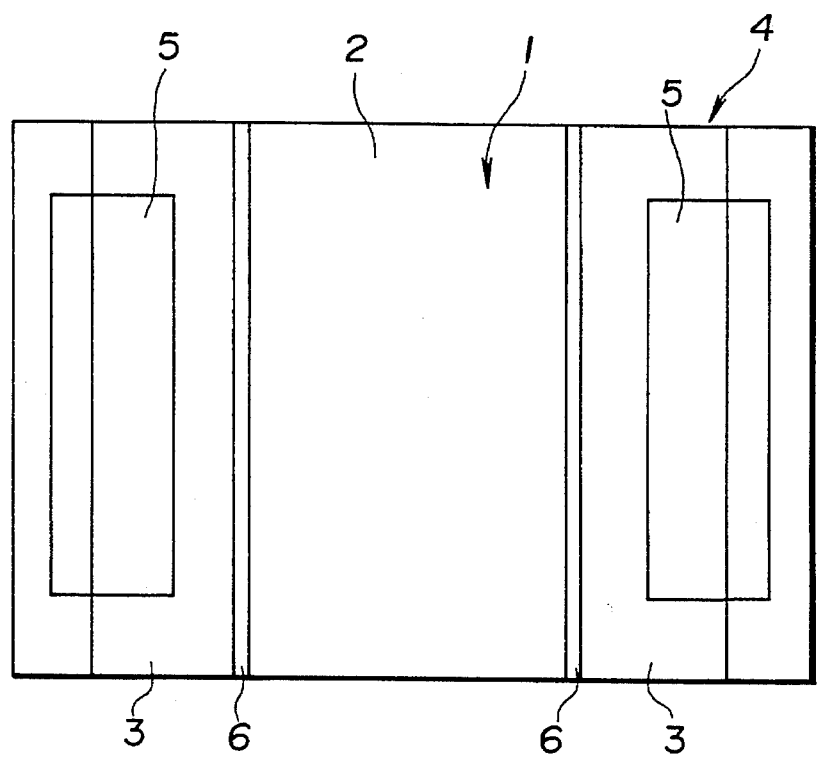
FIG. 2 is a plan view of the mold of FIG. 1.
Figure 4:
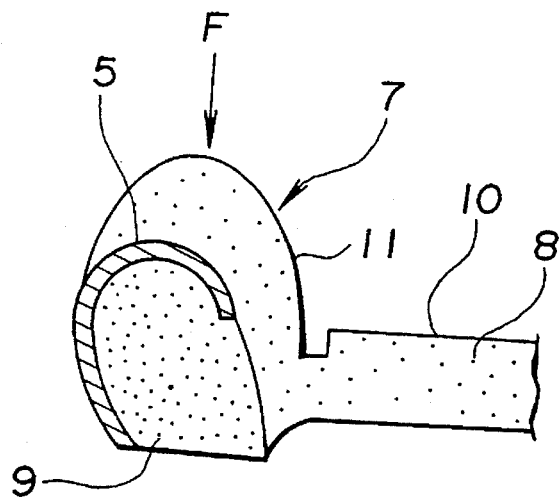
FIG. 4 is a fragmentary cross-sectional view of the pad produced by the present invention.

Referring to FIGS. 1 and 2 there is illustrated a mold arrangement for use in the practice of the present invention. The mold is designed to mold a seat pad 7 having a center seating portion 10 and bank portions 11 at opposite ends thereof as shown in FIG. 4. The mold 4 for foam molding defines a cavity 1 having a center region 2 corresponding to the center seat portion 10 and opposed side regions 3 and 3 corresponding to the bank portions 11 of the seat pad 7. In the cross section of FIG. 1, the center region 2 has a generally flat bottom surface and the side regions 3 each have a concave surface recessed relative to the center region including a bottom and outer and inner side walls extending therefrom. Collecting vessels 5 are attached to the outer wall of the side regions 3. Weir plates 6 are provided at the boundary between the center region 2 and the side regions 3. The shape of the collecting vessels 5, attachment thereof to the mold, and foaming/molding process are the same as in JP-A 261410/1991, which is incorporated herein by reference.

The present invention uses crosslinked polyolefin foam as the collecting vessels 5. The crosslinked polyolefin foam which can be used herein includes crosslinked polypropylene foam and crosslinked polyethylene foam. Crosslinking can be measured by gel-fraction. The range of gel-fraction of 20% to 50%, especially 30% to 40% are desirable. A gel-fraction of less than 20% may result in a lower flexural strength. A gel-fraction of higher than 50% may result in crack while vacuum forming process. Preferably it has a density of 0.025 to 0.10 g/cm$^3$, especially 0,030 to 0.080 g/cm$^3$. A density of less than 0.025 g/cm$^3$ corresponds to a lower flexural strength so that the collecting vessels will sometimes fail to retain their shape. With a density of higher than 0.10 g/cm$^3$, the collecting vessels will sometimes exert their hardness unnaturally after foaming and curing, failing to provide a seat pad with a comfortable feel.

The collecting vessels should have an index of surface wetting of at least 36 dyne/cm, preferably at least 38 dyne/cm as measured by the wetting test prescribed by JIS K-6768. With a wetting index below the limit, no stable adhesion is expectable, allowing delamination to occur within the seat pad when it is subject to repetitive compression deformation. To impart such an index of surface wetting, chemical surface modification methods such as primer coating are recommended rather than conventional well-known surface corona treatment. The surface corona treatment allows a substantial drop of surface wetting index to occur during pre-heating for the vacuum forming process or simply with the lapse of time, and it is then difficult to always retain the bondability to urethane foam. In contrast, the chemical surface modification can minimize a change of wetting index with temperature and time, ensuring stable wetting. The primer which can be used herein is not critical with any of commonly used well-known primers being useful. Chemical surface modification methods other than the primer coating include, for example, retention of alkali metal on the crosslinked polyolefin foam surface (see JP-A 255740/1990) and coating of resin varnish such as phenolic resin (see JP-A 231938/1991). Crosslinked polyolefin foam sheets are subject to chemical surface treatment before they are shaped to collecting vessels as by vacuum forming. Alternatively, crosslinked polyolefin foam sheets are shaped to collecting vessels before they are subject to chemical surface treatment.

Figure 3:
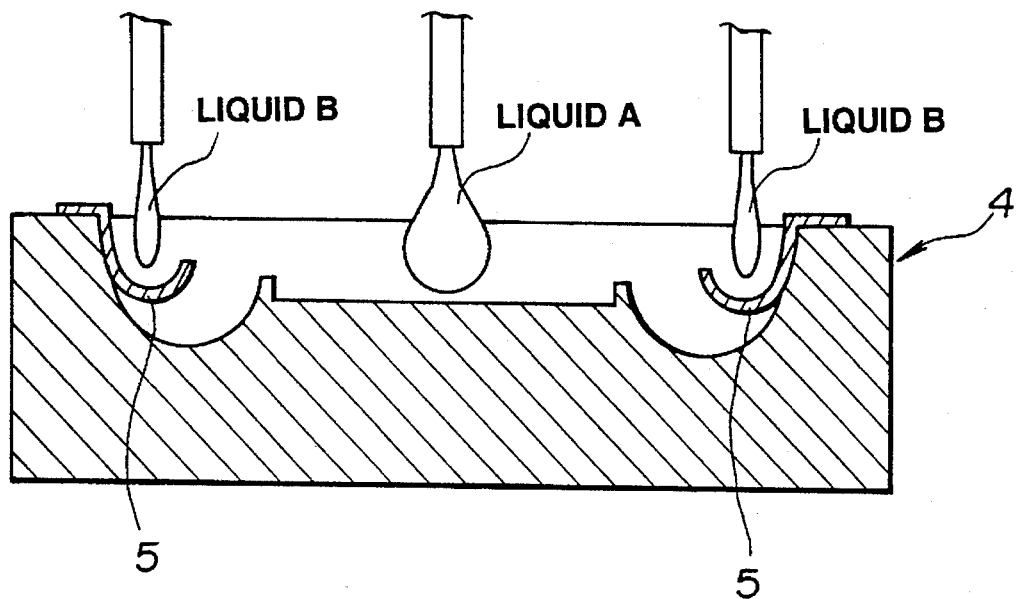
FIG. 3 illustrates how to pour foaming liquids into the mold cavity of FIGS. 1 and 2.

With the collecting vessels 5 arranged in the mold in the above-described manner, a seat pad is fabricated as shown in FIG. 3. A foamable polyurethane liquid for producing a low hardness foam (to be referred to as liquid A, hereinafter) is poured into the cavity 1 between the collecting vessels, and a foamable polyurethane liquid for producing a high hardness foam (to be referred to as liquid B, hereinafter) is poured into the collecting vessels. The liquids A and B are then caused to expand integrally. There is obtained a molded article or seat pad 7 in which the collecting vessels 5 are rigidly joined to the low hardness urethane foam 8 forming the seating portion and the high hardness urethane foam 9 as shown in FIG. 4 so that no separation may occur therebetween over a long term of use involving repetitive application of compression forces. Since the collecting vessels 5, 5 are spaced apart from the bottom and inner wall of the side regions 3, 3 in the mold arrangement, that section of the bank portion 11 disposed on the side of the seating portion 10 and the top F of the bank portion 11 corresponding to the bottom of the mold side region 3 are made of the low hardness urethane foam. This means that the portions which come in contact with and provide support for the human body are soft. Then this seat pad is comfortable to sit on.

EXAMPLE

Examples of the invention are given below together with comparative examples by way of illustration and not by way of limitation. The primer used for chemical surface treatment is Hibon 7820, a trade name of polyester primer commercially available from Hitachi Chemical Polymer K.K.

Example 1

A sheet of crosslinked polypropylene foam of 3 mm in gage (trade name Softron SP, density 0.033 g/cm$^3$, gel-fraction 35%, Sekisui Chemical Industry K.K.) was coated with the primer and formed into collecting vessels of the shape shown in FIGS. 1 and 2. At this point, the collecting vessels had an index of surface wetting of 44 dyne/cm.

There was furnished the foaming/molding mold 1 having the center region 2 for the seating portion and the side regions 3 for the bank portions as shown in FIGS. 1 and 2. The collecting vessels 5, 5 were attached to the side regions 3, 3, respectively. The ease of attachment of the collecting vessel to the mold was evaluated and rated as ease of mold attachment. Next, as shown in FIG. 3, a foamable liquid B for forming high rigidity foam with a hardness of 1.4 to 4 kg/20 mm diameter (25% Indentation Load Deflection) was poured into the collecting vessels and a foamable liquid A for forming low rigidity foam with a hardness of 10 to 20 kg/200 mm diameter was poured into the cavity center region. The shape retention of the collecting vessel upon pouring of the foamable liquid therein was evaluated and rated as "deformation by foaming liquid". Then concurrent integral foaming was effected. The expanding foam had Tmax of 135° C. inside the collecting vessels and Tmax of 110° C. in the center portion. At the end of foaming/curing, the molded product in the form of a seat pad was taken out of the mold.

The seat pad included the bank portions which were hard enough to provide good holding ability and the seating portion which was low in hardness and flexible. A repetitive vibration test was carried out for examining delamination. With a weight of 50 kg rested thereon, the seat pad was subject to 100,000 cycles of vibrations under a load of 0.7 G. No separation was observed between the collecting vessels and the urethane foam. A bond stripping test was carried out by stripping the cured urethane foam from the collecting vessel to find a material rupture in the urethane foam layer. The results are shown in Table 1.

Example 2

A sheet of crosslinked polyethylene foam of 3 mm in gage (trade name Toray PEF, density 0.033 g/cm$^3$ gel-fraction 35%, Toray K.K.) was coated with the primer and formed into collecting vessels. The same foamable urethane liquids as in Example 1 were poured and subject to concurrent integral foaming. The collecting vessels were soft to collect the foaming liquid therein and it was thus difficult to ensure stable introduction and expansion of the foamable liquids. Due to high Tmax, heat distortion of polyethylene was observed at the end of foaming/curing stage, which led to some variations in the hardness of the bank portions. No separation was observed at the end of the repetitive vibration test. The results are shown in Table 1.

Comparative Example 1

Without primer coating, a sheet of crosslinked polypropylene foam of 3 mm in gage (trade name Softron SP, density 0.033 g/cm$^3$, gel-fraction 35%, Sekisui Chemical Industry K.K.) was formed into collecting vessels as in Example 1. At this point, the collecting vessels had an index of surface wetting of 30 dyne/cm. A seat pad was molded as in Example 1 by attaching the collecting vessels to the side regions of the mold, pouring the foamable urethane liquids, and effecting concurrent integral foaming.

The seat pad included the bank portions which were hard enough to provide good holding ability and the seating portion which was low in hardness and flexible. A repetitive vibration test was carried out for examining delamination. With a weight of 50 kg rested thereon, the seat pad was subject to 100,000 cycles of vibrations under a load of 0.7 G. Separation was observed between the collecting vessels and the urethane foam. Sitting on this seat pad, one could perceive the collecting vessels as foreign matter. A bond stripping test was carried out by stripping the cured urethane foam from the collecting vessel to find that stripping occurred at the interface. The results are shown in Table 1.

Comparative Example 2

A sheet of non-crosslinked, expanded polyethylene foam of 3 mm in gage (trade name Lightron S, density 0.033 g/cm$^3$, Sekisui Chemical Industry K.K.) was coated with the primer and formed into collecting vessels as in Example 1. A seat pad was molded as in Example 1 by attaching the collecting vessels to the side regions of the mold, pouring the foamable urethane liquids, and effecting concurrent integral foaming. The collecting vessels were rigid enough to collect the foamable liquid therein, but due to high Tmax, heat distortion of polyethylene was observed at the end of foaming/curing stage, which led to substantial variations in the hardness of the bank portions. The results are shown in Table 1.

Comparative Example 3

Without primer coating, a sheet of polystyrene foam of 3 mm in gage (bead foaming type, trade name Hi-Beads, density 0.030 g/cm$^3$, Hitachi Chemicals K.K.) was formed into collecting vessels as in Example 1. A seat pad was molded as in Example 1 by attaching the collecting vessels to the side regions of the mold, pouring the foamable urethane liquids, and effecting concurrent integral foaming. The collecting vessels were partially dissolved by the action of the foamable agent (methylene chloride) in the foaming liquids. During the foaming/curing stage, the collecting vessels of polystyrene substantially deformed and contracted due to high Tmax into a hard coagulated state. A seat pad having hard bank portions could not be obtained. The results are shown in Table 1.

TABLE 1

|  | Example | | Comparative Example | | |
| --- | --- | --- | --- | --- | --- |
| Collecting vessel | 1 | 2 | 1 | 2 | 3 |
| Material | crosslinked PP foam | crosslinked PE foam | crosslinked PP foam | non-crosslinked PE foam | polystyrene foam |
| Primer coating | treated | treated | none | treated | none |
| Ease of mold attachment | Good | Fair | Good | Fair | Good |
| Deformation by foaming liquid | none | none | none | none | deformed |
| Deformation after foaming/curing | none | slightly deformed | none | deformed | deformed |
| Repetitive vibration test | sound | sound | separated interfacial stripping | — | — |
| Stripping test | material rupture | material rupture | | material rupture | (much deformed) |
| Overall rating | Excellent | Fair | Poor | Poor | Poor |

There has been described a method for molding a seat pad having a seating portion and a bank portion on either side thereof or along the periphery thereof wherein the bank portion has high hardness to provide for holding support. The seat pad is fully durable against repetitive loading.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for molding a polyurethane seat pad having a center seat portion and bank portions on opposite sides thereof or along the periphery thereof using a mold defining a cavity having a center region corresponding to the center seat portion and side regions corresponding to the bank portions, comprising the steps of:

placing collecting vessels of expanded polyolefin in the side regions of the mold cavity, pouring a foamable polyurethane liquid for producing a low hardness foam into the cavity between said collecting vessels, pouring a foamable polyurethane liquid for producing a high hardness foam into said collecting vessels, and causing the foamable liquids to expand thereby producing a polyurethane seat pad having the collecting vessels embedded therein, wherein said expanded polyolefin is a crosslinked polyolefin foam having an index of surface wetting of at least 36 dyne/cm, a gel-fraction of 20 to 50% and density of 0.025 to 0.10.

2. The method of claim 1, wherein said crosslinked polyolefin foam has been chemically modified so as to have an index of surface wetting of at least 36 dyne/cm.

3. The method of claim 1, wherein in the step of placing collecting vessels of expanded polyolefin in the side regions of the mold cavity, each said collecting vessel is spaced apart from the bottom and inner wall surfaces of the corresponding side region.

4. The method according to claim 1, wherein said crosslinked polyolefin foam has a gel-fraction of 30 to 40%.

5. The method according to claim 1, wherein said crosslinked polyolefin foam has a density of 0.030 to 0.080 g/cm$^3$.

6. The method according to claim 1, wherein the index of surface wetting is at least 38 dyne/cm.

7. The method according to claim 1, wherein said crosslinked polyolefin foam is selected from the group consisting of crosslinked polyethylene foam and crosslinked polypropylene foam.

8. The method according to claim 2, wherein said chemical modification comprises the coating of the surface of said crosslinked polyolefin foam with primer.

9. The method according to claim 8, wherein said primer comprises a polyester.

10. The method according to claim 6, wherein said crosslinked polyolefin foam has a gel-fraction of 30% to 40%.

11. The method according to claim 7, wherein said crosslinked polyolefin foam is crosslinked polypropylene foam.

12. The method according to claim 10, wherein said crosslinked polyolefin foam is crosslinked polypropylene foam.

* * * * *